April 1, 1947.   P. M. ADAMSON   2,418,243
PISTON RING
Filed Dec. 18, 1944
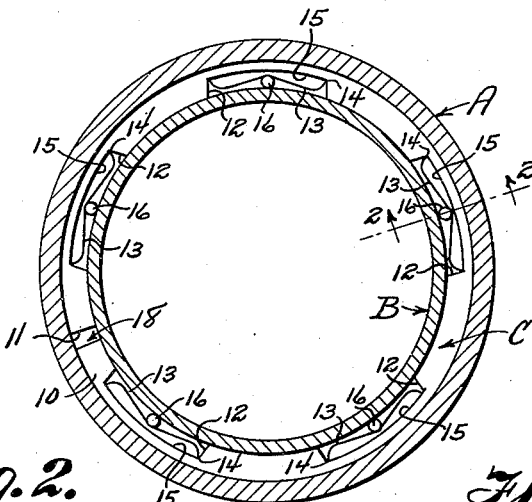
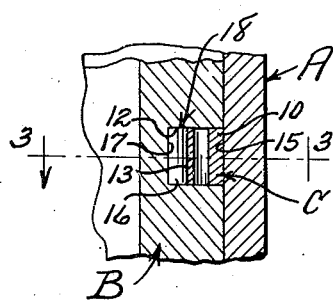
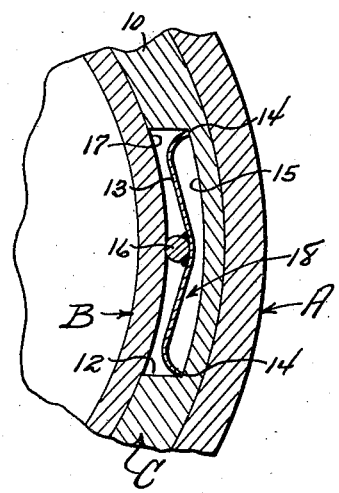
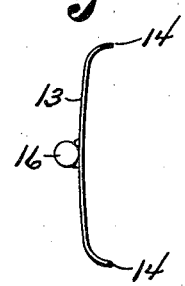
INVENTOR.
Paul Matthew Adamson
BY *Victor J. Evans & Co.*
ATTORNEYS Patented Apr. 1, 1947

2,418,243

UNITED STATES PATENT OFFICE 2,418,243

PISTON RING

Paul Matthew Adamson, Detroit, Mich.

Application December 18, 1944, Serial No. 568,701

2 Claims. (Cl. 309—41)

The invention relates to a piston ring, and more particularly, to split expanding piston rings.

The primary object of the invention is the provision of a ring of this character, wherein it is split crosswise, and has pocketed therein tensioning spring bows, which function to maintain the ring in complete contact with the wall of the engine cylinder, to avoid oil leakage past the piston under working conditions thereof within the cylinder.

Another object of the invention is the provision of a piston ring of this character, wherein it is of the frictionless inner spring type, and the springs have a rocking motion, for the flexing of the ring and also urges the latter in yielding contact with the wall of a cylinder in which the piston works, and assuring elastic motion and tension at all times.

A further object of the invention is the provision of a piston ring of this character, which is simple in construction, thoroughly reliable and efficient in operation, strong, durable, readily and easily applied and removed, assuring against oil leakage between the piston and cylinder, the inner springs to the ring, being devoid of rubbing action against the latter, thus reducing friction, and the ring is inexpensive to manufacture and install.

With these and other objects in view, the invention consists in the features of construction, combination and arrangement of parts as will be hereinafter more fully described, illustrated in the accompanying drawing, which discloses the preferred embodiment of the invention, and pointed out in the claims hereunto appended.

In the accompanying drawing:

Figure 1 is a horizontal view through a piston cylinder and piston, showing the ring constructed in accordance with the invention applied and in working position.

Figure 2 is a sectional view taken on the line 2—2 of Figure 1 looking in the direction of the arrows.

Figure 3 is a sectional view taken on the line 3—3 of Figure 2 looking in the direction of the arrows.

Figure 4 is a detail elevation of one of the inner springs for the piston ring.

Similar reference characters indicate corresponding parts throughout the several views in the drawing.

Referring to the drawings, A designates generally a portion of a piston cylinder, which is of any ordinary construction and B denotes a portion of the skirt of a piston, which also is of the usual type, while interfitting the said piston is the piston ring C constituting the present invention and hereinafter described.

The piston ring C comprises a circular ring-like body 10, which is transversely cut to form a split 11, so that such body can expand and contract, it being inherently resilient or yieldable.

Opening through the outer face of the body 10 at determined intervals circumferentially thereof is a series of elongated pockets 12 which are spaced apart from each other. In each of these pockets 12 is placed a bow-shaped leaf spring 13, it having the ends 14 thereof making contact with the flooring 15 of the pocket, while centrally on the said spring 13 at the reverse side to that from which the ends 14 project, is a roller-like fulcrum 16, adapted for contact with the skirt B of the piston, at the flooring 17 of the channel or groove 18, in which the body 10 is snugly but loosely fitted, the said groove 18 being within the said skirt B of the piston. The fulcrum 16 affords a rocker for the spring 13, and causes a tensioning of the latter, so as to urge the body 10 in contact with the wall of the cylinder for the said piston, and in this manner keeping the piston ring under constant expanding action, to avoid leakage of oil between the piston and cylinder.

The fulcrum 16 is united with the spring 13 in any suitable manner.

What is claimed is:

1. A piston ring of the kind described, comprising a ring-like split body having a plurality of elongated pockets opening through the inner periphery thereof, substantially bow shaped leaf springs confined within the pockets with its ends making contact with the flooring of the latter, and rocker means welded to the spring midway of the spring at the inner surface of said bow for piston contact.

2. A piston ring of the kind described, comprising a ring-like split body having a plurality of elongated pockets opening through the inner periphery thereof, substantially bow shaped leaf springs confined within the pockets with its ends making contact with the flooring of the latter, rocker means welded to the spring midway of the spring at the inner surface of said bow for piston contact and a roller-like fulcrum included with said rocker means.

PAUL MATTHEW ADAMSON.

REFERENCES CITED

The following references are of record in the file of this patent:

UNITED STATES PATENTS

| Number | Name | Date |
| --- | --- | --- |
| 93,273 | Brown | Aug. 3, 1869 |
| 1,374,206 | Jacob | Apr. 12, 1921 |